(12) United States Patent
Spencer et al.

(10) Patent No.: US 10,247,817 B2
(45) Date of Patent: Apr. 2, 2019

(54) RADAR SYSTEM WITH MEASUREMENT DOMAIN TRACKING UPDATES

(71) Applicant: Veoneer US, Inc., Southfield, MI (US)

(72) Inventors: Donald Spencer, Southfield, MI (US); Shane Murray, Southfield, MI (US)

(73) Assignee: Veoneer US, Inc., Southfield, MI (US)

( * ) Notice: Subject to any disclaimer, the term of this patent is extended or adjusted under 35 U.S.C. 154(b) by 120 days.

(21) Appl. No.: 15/598,986

(22) Filed: May 18, 2017

(65) Prior Publication Data

US 2018/0335513 A1    Nov. 22, 2018

(51) Int. Cl.
*G01S 13/66* (2006.01)
*G01S 13/72* (2006.01)
*G01S 13/93* (2006.01)

(52) U.S. Cl.
CPC .............. *G01S 13/72* (2013.01); *G01S 13/93* (2013.01); *G01S 13/66* (2013.01)

(58) Field of Classification Search
CPC ........... G01S 13/72; G01S 13/93; G01S 13/66
See application file for complete search history.

(56) References Cited

U.S. PATENT DOCUMENTS

| | | | |
|---|---|---|---|
| 5,343,203 A | 8/1994 | Chen | |
| 9,285,457 B2* | 3/2016 | Aryanfar | G01S 5/0294 |
| 2017/0276799 A1* | 9/2017 | Martin | G01S 19/32 |
| 2017/0307727 A1* | 10/2017 | Goda | G01S 7/352 |

* cited by examiner

*Primary Examiner* — Brandon J Miller
(74) *Attorney, Agent, or Firm* — Burns & Levinson, LLP; Steven M. Mills (57) ABSTRACT

Parameters of a propagated object state in a radar tracking system are converted from an object state domain to a measurement domain. The measurement domain includes parameters of a superposition of a chirp and a Doppler frequency of the reflected signal and the Doppler frequency. Deltas between measured states and propagated states are computed in the measurement domain to improve updating of the object state. An object track is more accurately updated based on the object state delta. Data association may be performed simultaneously in both the measurement domain and object domain. Propagated object state parameters in object domain coordinates can be checked for signal collisions to avoid signal collision errors. An improved noise model is also constructed in the measurement domain.

18 Claims, 6 Drawing Sheets

RADAR SYSTEM WITH MEASUREMENT DOMAIN TRACKING UPDATES

BACKGROUND

1. Technical Field

The present disclosure is in the field of radar signal processing and more particularly in the field of frequency modulated continuous wave (FMCW) radar tracking systems and tracker processing methods.

2. Discussion of Related Art

Figure 1:
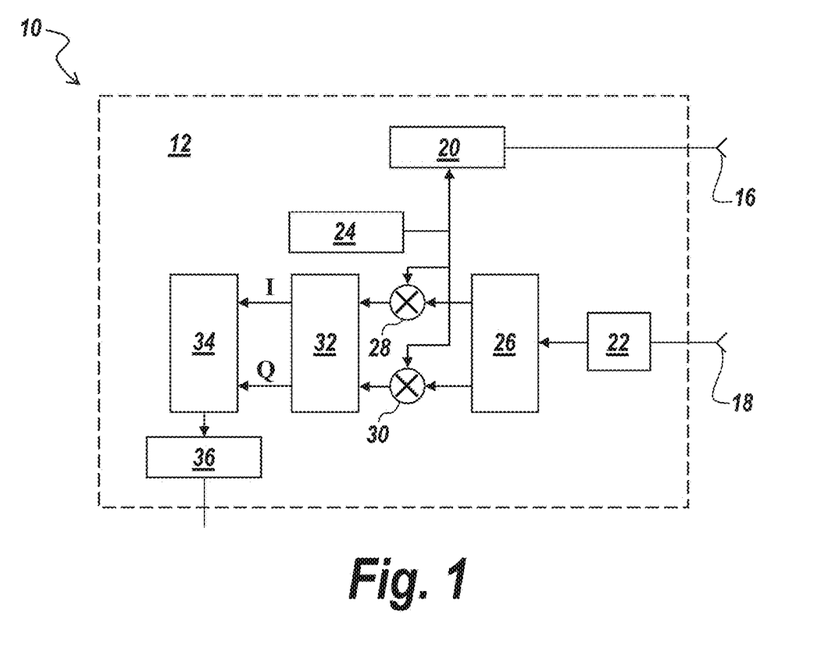
FIG. 1 includes a schematic block diagram of an automotive radar system, including one or more radar sensor modules for processing automotive radar signals.

FIG. 1 includes a schematic block diagram of an automotive radar system 10, including one or more radar sensor modules 12 for processing automotive radar signals, in accordance with some exemplary embodiments. Referring to FIG. 1, radar system 10 includes one or more radar modules 12, which process radar transmit and receive signals which are compatible with radar system 10 in the host vehicle. Radar sensor module 12 generates and transmits radar signals into the region of interest adjacent to the host vehicle that is being monitored by the radar system. Generation and transmission of signals is accomplished by RF signal generator 24, radar transmit circuitry 20 and transmit antenna 16. Radar transmit circuitry 20 generally includes any circuitry required to generate the signals transmitted via transmit antenna 16, such as signal shaping/timing circuitry, transmit trigger circuitry, RF switch circuitry, RF power amplifier circuitry, or any other appropriate transmit circuitry used by radar system 10 to generate the transmitted radar signal according to exemplary embodiments described in detail herein.

Radar module 12 also receives returning radar signals at radar receive circuitry 22 via receive antenna 18. Radar receive circuitry 22 generally includes any circuitry required to process the signals received via receive antenna 18, such as RF low noise amplifier circuitry, signal shaping/timing circuitry, receive trigger circuitry, RF switch circuitry, or any other appropriate receive circuitry used by radar system 10. In some exemplary embodiments, the received signals processed by radar receive circuitry 22 are forwarded to phase shifter circuitry 26, which generates two signals having a predetermined phase difference. These two signals, referred to as an in phase (I) signal and a quadrature (Q) signal, are mixed with an RF signal from RF signal generator 24 by mixers 28 and 30, respectively, to generate I and Q intermediate frequency (IF) signals. The resulting IF signals are further filtered as required by filtering circuitry 32 to generate filtered IF I and Q signals, labeled "I" and "Q" in FIG. 1. The IF I and Q signals are digitized by analog-to-digital converter circuitry (ADC) 34. These digitized I and Q IF signals are processed by a processor, such as a digital signal processor (DSP) 36. In some exemplary embodiments, the DSP 36 can perform all of the processing required to carry out the object detection and parameter determination, including object range, bearing and/or velocity determinations, performed by system 10.

It will be understood that the system configuration illustrated in FIG. 1 is exemplary only and that other system configurations can be used to implement the embodiments described herein. For example, the ordering of filtering of the IF signal and analog-to-digital conversion may be different than the order illustrated in FIG. 1. The IF signal may be digitized before filtering, and then digital filtering may be carried out on the digitized signal(s).

Figure 2:
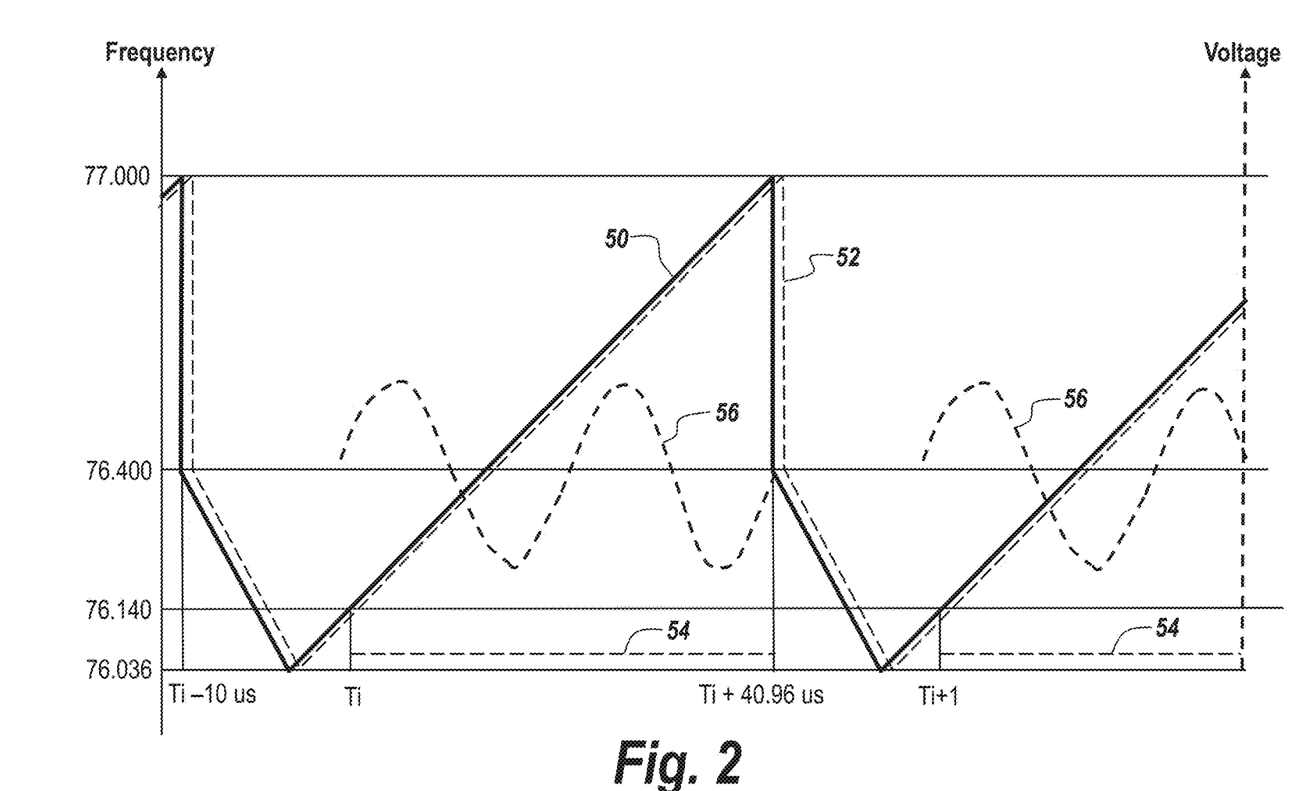
FIG. 2 includes a schematic timing diagram of signals in a conventional FMCW radar system.

According to the present disclosure, in a FMCW radar system, radar signals are transmitted into the region of interest in the form of continuous wave having a changing frequency. FIG. 2 includes a schematic timing diagram of signals in a conventional FMCW radar system. Referring to FIG. 2, transmitted radar signal 50, illustrated in a solid bold line, and the corresponding received radar signal 52, illustrated as a dashed bold line, are plotted as frequency vs. time. Curve 54 is a graph of the frequency of the IF signal, versus time. As shown in FIG. 2, the frequency of the IF signal FIF is the magnitude of the difference between the frequency of the transmitted signal FTX and the frequency of the received signal FRX. The IF output waveform is illustrated in curve 56 as voltage amplitude vs. time, superimposed in FIG. 2 over the frequency curves 50, 52, 54.

Referring to FIG. 2, in a conventional FMCW automotive radar system, radar signals are transmitted with a periodic linearly ramped frequency, as illustrated by curve 50. As a result, in the ideal case, a similarly linearly ramped return signal is received, shifted in time, as illustrated by curve 52. The frequency of the resulting IF signal is the difference between the frequencies of the two curves 50 and 52, which in the illustrated case is a constant. It is this IF waveform 56 that is processed to make radar detections and parameter determinations for objects in the region of interest.

In the particular exemplary waveforms illustrated in FIG. 2, the time of each linear frequency ramp is identified as Ti, where i is the index or number of the particular ramp. In the particular illustrations shown in FIG. 2, the period of each ramp cycle is approximately 50.96 μsec. The frequency of a transmitted radar signal in each ramp cycle increases linearly from approximately 76.036 GHz to approximately 77.000 GHz and then decreases rapidly through approximately 76.400 GHz and then slightly less rapidly back to the starting frequency of the next cycle at 76.036 GHz. The start of a first linear frequency ramp is illustrated to being at time Ti, and the start of the next cycle is illustrated to begin at time Ti+1. It will be understood that these particular parameters of the frequency ramp described herein are exemplary only. The present disclosure is applicable to any sets of parameters of the frequency ramps.

The frequency of a reflected FMCW radar signal is used to determine a target's range (R), which is its distance from the radar source, and the target's velocity relative to the radar source. The phase of a reflected FMCW radar signal relative to a transmitted radar signal, for example, is indicative of target direction and allows determination of the azimuth or horizontal angle between the target and the source, and elevation or vertical angle between the target and the source.

Conventional tracking circuitry in FMCW radar systems use digital signal processing techniques such as Kalman filter processing to predict and update state variables associated with a target based on inputs such as range, velocity, azimuth and elevation, that are derived from more fundamental measured signal attributes. For example, the more fundamental measured signal attributes used by FMCW radar systems include and FM Chirp Frequency+Doppler Frequency measurement ($f_{(chirp+Doppler)}$), and a velocity measurement. In conventional FMCW radar systems these measured signal attributes are used to determine range, velocity, azimuth, and elevation information for tracking of targets.

Conventionally, tracking of FM peaks is performed by first deriving the range and velocity of a target based on the measured chirp frequency+Doppler frequency ($f_{(chirp+Doppler)}$), and the measured velocity measurement.

The derived range and velocity information is then input along with azimuth and elevation to a tracking algorithm.

The step of determining range and velocity from $f_{(chirp+Doppler)}$ and measured velocity necessarily introduces some error into the range and velocity values. Because these determined range and velocity values are propagated by the tracker instead of the more fundamental $f_{(chirp+Doppler)}$ and velocity measurements, the computed deltas between a propagated track and a measurement as performed by a conventional tracker includes these noise or error components of the range and velocity values compounded by the introduction of additional error (noise) in computing the delta.

Conventional tracking algorithms generally assume the FM sampling time T to be very small. Conventional tracking algorithms also generally ignore the Doppler frequency contribution to the range calculation. However, when the FM sampling time is large relative to the sampling time of the sensor, the Doppler frequency contribution to the range calculation is not negligible, as conventionally assumed. This further reduces the accuracy of computed deltas. These sources of error in the computed deltas detrimentally affect propagation of the track and reduces tracking accuracy.

The use of derived range and velocity as inputs in conventional trackers also detrimentally affects modeling of signal noise when converted from $f_{(chirp+Doppler)}$ to range, for example.

Additionally, when the range and velocity profiles of multiple targets within the same sample space merge, phase information in the signals also merges. This, leads to inaccurate measurements of phase and subsequent inaccurate measurements of azimuth and elevation.

SUMMARY

According to aspects of the present disclosure, measurement coordinates of a radar system are maintained in the original $f_{(chirp+Doppler)}$ space, and the coordinates of detected objects are maintained in real world coordinates, such as Cartesian or polar coordinates, for example. An observation matrix is used to convert between the measurement coordinates and the object coordinates. According to an aspect of the present disclosure, both the object coordinates (in polar or Cartesian) and the measurement coordinates are both available at all times.

Another aspect of the present disclosure includes modeling of signal noise in $f_{(chirp+Doppler)}$ coordinates. Noise is more easily and accurately modeled based on the actual measurements rather than parameters that are computed from the actual measurements.

Another aspect of the present disclosure includes detection and track association gating and scoring using the measurement $f_{(chirp+Doppler)}$ coordinates. Tracking in $f_{(chirp+Doppler)}$ space also allows tracks to be gated with respect to $f_{(chirp+Doppler)}$.

Another aspect of the present disclosure includes checking for crossing tracks to minimize the effect of phase corruption of tracks that are crossing in range-velocity space. Tracks crossing in frequency can be forced to coast or handled in other ways, such as by looking for two signals inside one frequency bin instead of assuming only a single signal in a bin, for example.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Traditionally, a reflected radar signal can be modeled as a target frequency ($f_{target}$) that includes a frequency component ($f_{chirp}$) indicating range of the target based on frequency modulation of the transmitted signal, and a frequency component ($f_{Doppler}$) indicating the Doppler velocity of the target. The components of a reflected radar signal that are actually measured are the $f_{chirp}$ and $f_{DopplerVelocity}$. These and other directly measured characteristics of a reflected radar signal are referred to herein as measurement domain parameters, or measurement coordinates. After the measurement domain parameters $f_{target}$ and $f_{Dopplervelocity}$ are measured, conventional radar systems convert this measured information into object coordinates of a target, such as range and velocity of the target and propagate target tracks based on the object coordinates. These and other derived characteristics of the reflected radar signal are referred to herein as object domain parameters, or object coordinates.

A radar signal reflected from a target of a transmitted FMCW (Frequency Modulated Continuous Wave) system may be modelled by the following equation:

$$f_{target} = f_{chirp} + f_{DopplerVelocity} \qquad \text{Equation 1.}$$

or equivalently $$f_{target} = \frac{f_{bandwidth} T_{time\ of\ flight}}{T_{transmit}} + f_{DopplerVelocity}. \qquad \text{Equation 2}$$

In Equation 2, bandwidth ($f_{bandwidth}$), time of flight ($T_{time\ of\ flight}$) and transmit time ($T_{transmit}$) are substituted for the range frequency component $f_{range}$.

Substituting range (R) terms for time of flight and Doppler velocity terms leads to:

$$f_{target} = \frac{2Rf_{bandwidth}}{cT_{transmit}} + \frac{2\dot{R}f_{carrier}}{c}. \qquad \text{Equation 3}$$

This frequency based form can be simplified to a dimensionless bin space by multiplying by the transmit time as follows:

$$f_{target} T_{transmit} = Bin_{target}$$

$$Bin_{target} = Bin_{chirp} + Bin_{Doppler}$$

$$Bin_{target} = \frac{2Rf_{bw}}{c} + \frac{2Rf_{carrier}T_{transmit}}{c}.$$

Equation 4

Equation 5

In Equation 4, $Bin_{target}$ includes a range term and a velocity term.

According to an aspect of the present disclosure, the measurement domain parameters are used when updating a propagated state of a target. This increases the accuracy of the updated state of the target.

According to another aspect of the present disclosure, noise estimates are computed using measurement domain parameters. These noise estimates are more accurate than noise estimates computed using object coordinates in conventional trackers, because converting to object coordinates introduces additional noise and uncertainty.

For example, in an illustrative embodiment, the object state parameters of a propagated object state of an object are converted from the object state domain to a measurement domain parameters in the measurement domain. A difference between measured measurement domain parameters and the computed measurement domain parameters is used to determine a measurement domain delta of the object state. The measurement domain delta is used for updating the propagated object state.

As described below, an observation matrix may be used to convert between measurement domain parameters and object parameters.

In the simple linear case, the object state in polar coordinates may be represented by:

$$\hat{x}_{k|k} = \begin{bmatrix} x_{k|k} \\ \dot{x}_{k|k} \\ \ddot{x}_{k|k} \end{bmatrix}.$$

Equation 5

And the measurement matrix may be represented by:

$$\hat{z}_k = \begin{bmatrix} Bin_{target} \\ V_{target} \end{bmatrix}.$$

Equation 6

In this example, an observation matrix, commonly referred to as an H matrix, may be represented by $$[H_k] = \begin{bmatrix} 2f_{bw}/c & 2T_{transmit}f_{carrier}/c & 0 \\ 0 & 1 & 0 \end{bmatrix}.$$

Equation 7

The H matrix in Equation 7 can be used to convert between measurement domain coordinates and object domain coordinates in a three dimensional state object model (position, velocity, acceleration).

The conversion from object state coordinates to measurement coordinates for a measurement-prediction residual can be represented by:

$$\begin{bmatrix} Bin_\Delta \\ V_\Delta \end{bmatrix} = [z_k] - H_k \hat{x}_{k|k-1}$$

$$= \begin{bmatrix} Bin_{meas} \\ V_{meas} \end{bmatrix} - \begin{bmatrix} 2f_{bw}/c & 2T_{transmit}f_{carrier}/c & 0 \\ 0 & 1 & 0 \end{bmatrix} \begin{bmatrix} x_{k|k-1} \\ \dot{x}_{k|k-1} \\ \ddot{x}_{k|k-1} \end{bmatrix}.$$

Equation 8

The noise of the measurement can be represented by:

$$R_k = \begin{bmatrix} \sigma^2_{Bin_{target}} & 0 \\ 0 & \sigma^2_{velocity_{target}} \end{bmatrix}.$$

Equation 9

A number of different filtering techniques, such as a Kalman filter technique, for example, may be used for tracking a target based on the disclosed model of a reflected signal. Conventionally, a Kalman filter tracks an estimated state of a system along with a variance of the estimate. Measurements are used along with a state transition model to update the estimated state.

Regardless of the filtering technique, the noise matrix representing the noise of the measurement, observation matrix representing the coordinate transform between measurement and object coordinates, and state matrix representing tracked object state coordinates can be modeled.

In one filtering implementation, the noise conversion, state propagation, state updates, and application of the conversion between measurement coordinates and state object coordinates (such as Cartesian or Polar) are performed using a Kalman filter. Persons having ordinary skill in the art should be familiar with the following equations representing implementation of a Kalman filter according to an aspect of the present disclosure.

Prediction Steps

State Update: $\hat{x}_{k|k-1} = F_k \hat{x}_{k-1|k-1} + B_k u_k$  Equation 11.

Covariance Update: $P_{k|k-1} = F_k P_{k-1|k-1} F_k^T + Q_k$  Equation 12.

Update

Measurement-Prediction Residual: $\tilde{y}_k = z_k - H_k \hat{x}_{k|k-1}$  Equation 13.

Innovation: $S_k = H_k P_{k|k-1} H_k^T + R_k$  Equation 14.

Kalman Gain: $K_k = P_{k|k-1} H_k^T S_k^{-1}$  Equation 15.

State Update: $\hat{x}_{k|k} = \hat{x}_{k|k-1} + K_k \tilde{y}_k$  Equation 16.

Covariance Update: $P_{k|k} = (I - K_k H_k) P_{k|k-1}$  Equation 17.

In Cartesian form, the following filter may be used as a modification of the Jacobian matrix of an extended Kalman filter by using the following H matrix to compute the measurement—prediction residual:

$$\begin{bmatrix} Bin_\Delta \\ V_\Delta \\ \theta_\Delta \end{bmatrix} = [z_k] - H_k \hat{x}_{k|k-1} = \begin{bmatrix} Bin_{measurement} \\ V_{measurement} \\ \theta_{measurement} \end{bmatrix} - $$

$$\begin{bmatrix} C_1 dr\_dx\_C_2 drdot\_dxdot & -C_2 drdot\_dxdot & 0 & C_1 dr\_dy\_C_2 drdot\_dydot & -C_2 drdot\_dydot & 0 \\ drdot\_dx & drdot\_dxdot & 0 & drdot\_dy & drdot\_dydot & 0 \\ y_k/r^2 & 0 & 0 & -x_k/r^2 & 0 & 0 \end{bmatrix} \begin{bmatrix} x_{k|k-1} \\ \dot{x}_{k|k-1} \\ \ddot{x}_{k|k-1} \\ y_{k|k-1} \\ \dot{y}_{k|k-1} \\ \ddot{y}_{k|k-1} \end{bmatrix}.$$

Equation 18

In equation 18, the acceleration term in the Bin calculation is omitted for simplicity. The various elements of equation 18 are defined as follows:

$C1 = 2f_{bw}/c$ $C2 = 2T_{transmit} f_{carrier}/c$ $C2 = T_{transmit}^2 f_{carrier}/c$ theta = $a\tan 2(x\text{hat}(1), x\text{hat}(4))$;

sq = $x\text{hat}(1)^2 + x\text{hat}(4)^2$;

r = sqrt(rsq);

r_cube = $r*rsq$;

dot_prod = $x\text{hat}(1)*x\text{hat}(2) + x\text{hat}(4)*x\text{hat}(5)$;

dr_dx = $x\text{hat}(1)/r$;

dr_dy = $x\text{hat}(4)/r$;

drdot_dx = $x\text{hat}(2)/r - (x\text{hat}(1)*\text{dot\_prod}/r\_cube)$;

drdot_dy = $x\text{hat}(5)/r - (x\text{hat}(4)*\text{dot\_prod}/r\_cube)$;

drdot_dxdot = $x\text{hat}(1)/r = x/r$;

drdot_dydot = $x\text{hat}(4)/r = y/r$;

H = [$C1*dr\_dx - C2*drdot\_dx - C2*drdot\_dx$dot 0
    $C1*dr\_dy - C2*drdot\_dy - C2*drdot\_dy$dot 0;
    drdot_dx drdot_dxdot 0 drdot_dy drdot_dydot
    0; $x\text{hat}(4)/(rsq)$ 0 0 $-x\text{hat}(1)/(rsq)$ 0 0].

zhat = [centroid_hat rdot theta]' centroid_hat = $C1*r - C2*rdot$ rsq = $x\text{hat}(1)^2 + x\text{hat}(4)^2$;

r = sqrt(rsq);

theta = $a\tan 2(x\text{hat}(1), x\text{hat}(4))$;

resid = $M - z\text{hat}$;

covres = $H*\text{phat}*H' + R$;

cinv = inv(covres);

nr = resid'*cinv*resid.

In this implementation, the normalized residual score, is the result of a chi-square distribution with 3 degrees of freedom. Detections may be associated with tracks using a likelihood score as follows:

d = det(covres);

likelihood = $\exp(-nr/2)/\text{sqrt}(d*\text{power}(2*pi, 3))$;

According to an aspect of the present disclosure, this model, using the polar or Cartesian Jacobian matrices, may also be used in gating and association of tracks, wherein gating and association can be performed in the bin, velocity, and azimuth space instead of range, velocity, and angle.

According to another aspect of the present disclosure, the association and gating may be performed in 4D bin, range, velocity, azimuth space. For example gating detections to tracks by using the covariance of the state $$\begin{bmatrix} Bin_\Delta \\ R_\Delta \\ V_\Delta \\ \theta_\Delta \end{bmatrix} = [z_k] - H_k \hat{x}_{k|k-1} = \begin{bmatrix} Bin_{meas} \\ R_{meas} \\ V_{meas} \\ \theta_{meas} \end{bmatrix} - $$

$$\begin{bmatrix} C_1 dr\_dx\_C_2 drdot\_dxdot & -C_2 drdot\_dxdot & 0 & C_1 dr\_dy\_C_2 drdot\_dydot & -C_2 drdot\_dydot & 0 \\ dr\_dx & 0 & 0 & dr\_dy & 0 & 0 \\ drdot\_dx & drdot\_dxdot & 0 & drdot\_dy & drdot\_dydot & 0 \\ y_k/r^2 & 0 & 0 & -x_k/r^2 & 0 & 0 \end{bmatrix} \begin{bmatrix} x_{k|k-1} \\ \dot{x}_{k|k-1} \\ \ddot{x}_{k|k-1} \\ y_{k|k-1} \\ \dot{y}_{k|k-1} \\ \ddot{y}_{k|k-1} \end{bmatrix}.$$

Equation 19

The various elements of equation 19 are defined as follows:

$zhat = [\text{centroid\_hat } rdot \text{ theta}]$;

$\text{centroid\_hat} = C1*r - C2*rdot$;

$rsq = xhat(1)^2 + xhat(4)^2$;

$r = \text{sqrt}(rsq)$;

$\text{theta} = a\tan 2(xhat(1), xhat(4))$;

$\text{resid} = M - zhat$;

$\text{covres} = H*\text{phat}*H' + R$;

$cinv = \text{inv}(\text{covres})$;

$nr = \text{resid}'*cinv*\text{resid}$;

$d = \det(\text{covres})$;

$\text{likelihood} = \exp(-nr/2)/\text{sqrt}(d*\text{power}(2*pi,3))$.

The ability to use measurement coordinates such as bin as a measurement update and for gating and association as disclosed herein provides an additional level of discrimination that is not available in conventional radar systems and tracking methods.

A system for tracking an object, according to an aspect of the present disclosure includes a signal transmitter for transmitting a transmitted signal into a region, and a receiver for receiving reflected signals generated by reflection of the transmitted signals from an object in the region.

A processor coupled to the receiver is configured to determine first measurement domain parameters of the reflected signal in a measurement domain, compute a propagated object state of the object based on an object state parameters in an object state domain, convert the object state parameters of the propagated object state of the object from the object state domain to a second measurement domain parameters in the measurement domain, and compute a difference between the first measurement domain parameters and second measurement domain parameters to determine a measurement domain delta of the object state.

According to aspect of the present disclosure, the measurement domain delta of the object state is converted to an object state delta of the object in the object state domain. An object track is updated based on the object state delta. The measurement domain includes parameters of a superposition of a chirp and a Doppler frequency of the reflected signal, and the Doppler frequency.

According to an aspect of the present disclosure the conversions between the object state domain and the measurement domain additionally uses the transmitted signal properties of chirp bandwidth, transmit time, the speed of light through the propagation medium, and carrier frequency. In certain implementations, the conversions between the object state domain and the measurement domain use at least position and velocity terms. In an alternative implementation, the conversions between the object state domain and the measurement domain uses at least position, velocity, and acceleration terms.

Another aspect of the present disclosure includes a noise model in the measurement domain of a superposition of a chirp and a Doppler frequency of the reflected signal, and the Doppler frequency.

Aspects of the present disclosure also include a method of data association in the measurement domain. In an illustrative embodiment, the data association may be performed simultaneously in both the measurement domain and object domain, for example. Embodiments of the disclosed system method may also include steps of data association between a numerous measurement domain parameters, wherein the data association is done in the object domain. The object domain coordinates may be Cartesian coordinates, for example.

According to another aspect of the present disclosure, a radar tracker system may include a number of updated tracks and a number of measurement domain parameters. A number of propagated object state parameters of the object in the object coordinates are checked to see if there is a collision between the predicted superposition of a chirp and a Doppler frequency of the reflected signal. In the case of a collision, updating of colliding tracks using the measurement state delta may be cancelled.

Figure 3:
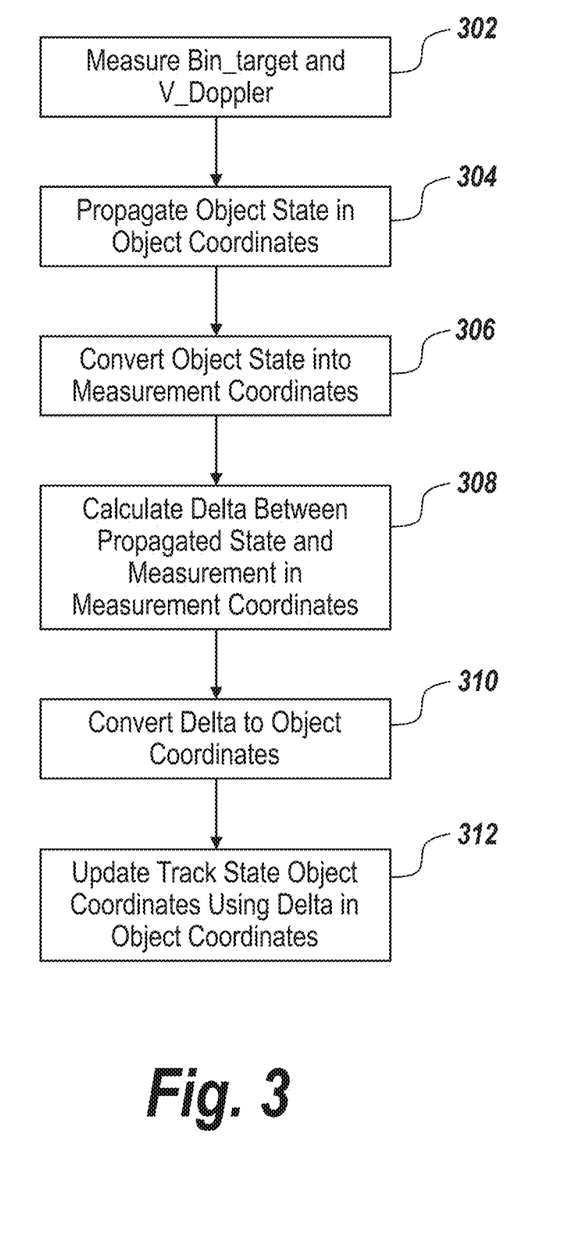
FIG. 3 is a process flow diagram showing a method for updating tracks in a FMCW radar system according to an aspect of the present disclosure.

A method of updating tracks in a FMCW radar system according to an aspect of the present disclosure is described with reference to FIG. 3. At block 302, the Bin and velocity of a target are measured and determined in measurement coordinates. At block 304, an object state is propagated in object coordinates. In other words, using the object coordinates defining an existing state of a target object, e.g., the object's velocity and acceleration, a predicted state of the object is computed in object coordinates. At block 306, the object coordinates of the predicted state are converted into corresponding measurement coordinates, e.g. Bin and velocity. At block 308, these measurement coordinates of the objects predicted state are compared with the measurement coordinates that were measured at block 302 to calculate deltas between the propagated state and the measurement in measurement coordinates. At block 310, the deltas are converted to object coordinates. According to aspects of the present disclosure, the conversion from object coordinates to measurement coordinates at block 306, and vice versa at block 310 may be performed using an observation matrix [H], as shown in equation 8, for example. At block 312, the deltas are input in object coordinates to a filter such as a Kalman filter, for example, to update the predicted state of the object. The updated predicted state of the object as determined by the disclosed method is more accurate compared to conventional tracking methods, because the disclosed model for computing deltas and converting between object coordinates and measurement coordinates is improved to reduce values of the deltas.

Figure 4:
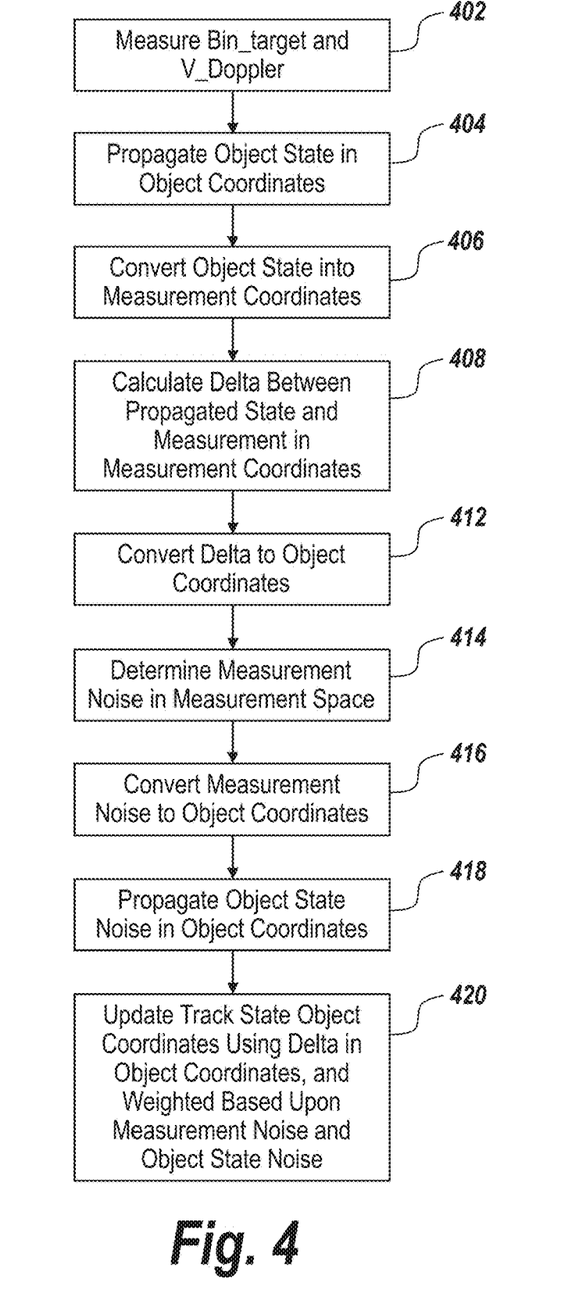
FIG. 4 is a process flow diagram showing a method for modeling noise in a FMCW radar system according to an aspect of the present disclosure.

A method of modeling noise in a FMCW radar system according to another aspect of the present disclosure is described with reference to FIG. 4. At block 402, the Bin and velocity of a target are measured and determined in measurement coordinates. At block 404, an object state is propagated in object coordinates. In other words, using the object coordinates defining an existing state of a target object, e.g., the object's velocity and acceleration, a predicted state of the object is computed in object coordinates. At block 406, the object coordinates of the predicted state are converted into corresponding measurement coordinates, e.g. Bin and velocity.

At block 408, these measurement coordinates of the objects predicted state are compared with the measurement coordinates that were measured at block 402 to calculate deltas between the propagated state and the measurement in measurement coordinates. At block 410, the deltas are converted to object coordinates. According to aspects of the present disclosure, the conversion from object coordinates to measurement coordinates at block 406, and vice versa at block 410 may be performed using an observation matrix

[H], as shown in equation ???, for example. At block 412, measurement noise of the measurement is determined in measurement coordinates. Thus the noise is modeled in the measurement space. For example, instead of estimating or computing noise in object coordinates, such as a range value, the disclosed method models the noise in measurement coordinates, such as Bin. Therefore, the tracker models noise in a signal directly, rather than modeling noise in a derived value which combines numerous different noise sources. This improves the accuracy of the tracker by avoiding effects of compounding noise estimates.

At block 414, the measurement coordinates of the measurement noise are converted to object coordinates. At block 416, the object state noise is propagated in object coordinates. In other words, using the object coordinates defining the measurement noise, a predicted noise of the measurement is determined in object coordinates. At block 418, the deltas are input in object coordinates to a filter such as a Kalman filter, for example, and weighted based on measurement noise and object state noise.

Figure 5:
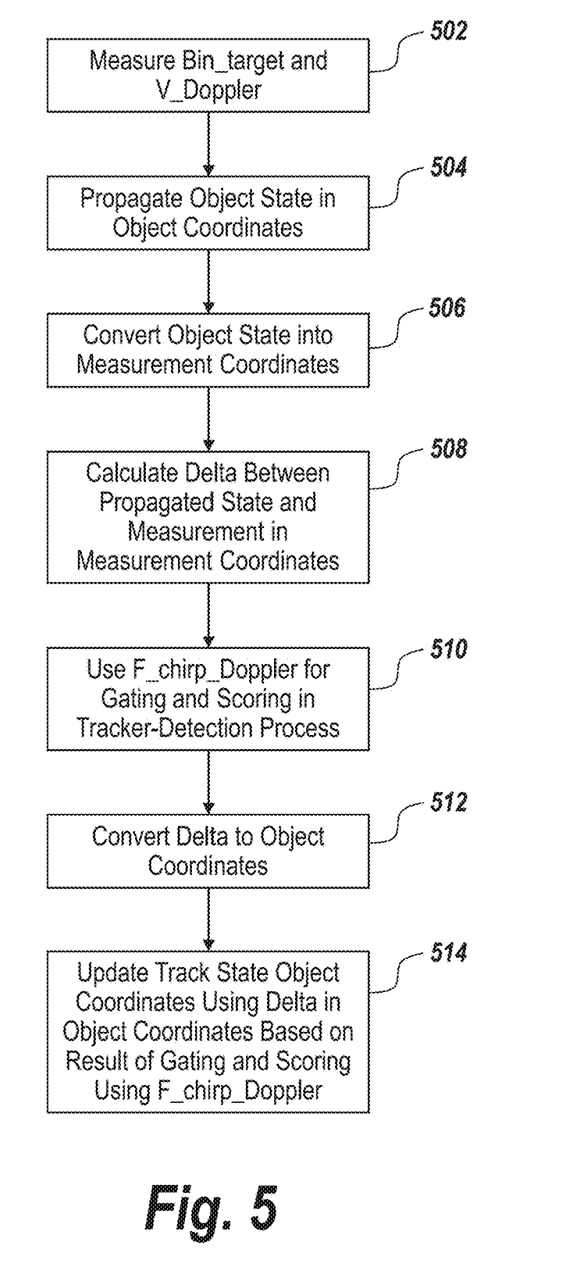
FIG. 5 is a process flow diagram showing a method for gating and scoring to propagate tracks in a FMCW radar system according to an aspect of the present disclosure.

A method of gating and scoring to propagate tracks in a FMCW radar system according to another aspect of the present disclosure is described with reference to FIG. 5. At block 502, the Bin and velocity of a target are measured and determined in measurement coordinates. At block 504, an object state is propagated in object coordinates. In other words, using the object coordinates defining an existing state of a target object, e.g., the object's velocity and acceleration, a predicted state of the object is computed in object coordinates. At block 506, the object coordinates of the predicted state are converted into corresponding measurement coordinates, e.g. Bin and velocity. At block 508, these measurement coordinates of the objects predicted state are compared with the measurement coordinates that were measured at block 502 to calculate deltas between the propagated state and the measurement in measurement coordinates. At block 510, the deltas are converted to object coordinates. According to aspects of the present disclosure, the conversion from object coordinates to measurement coordinates at block 506, and vice versa at block 510 may be performed using an observation matrix [H], as shown in equations 8, 18 or 19 for example.

At block 510, chirp frequency and Doppler are used for gating and scoring in a tracker—detection process. At block 512, the deltas are converted from measurement coordinates to object coordinates. At block 514, track state object coordinates are updated using deltas in object coordinates based on results of the gating and scoring in block 510.

Figure 6:
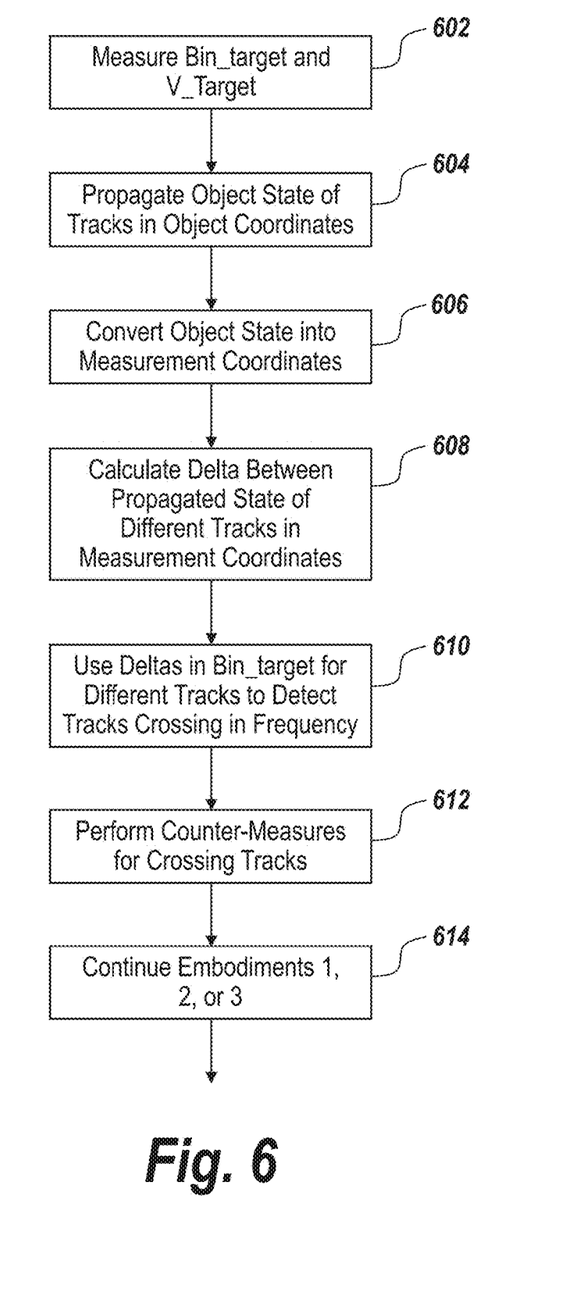
FIG. 6 is a process flow diagram showing a method for mitigating crossing of tracks in a FMCW radar system . . . according to an aspect of the present disclosure.

A method of mitigating crossing of tracks in a FMCW radar system according to another aspect of the present disclosure is described with reference to FIG. 6. At block 602, the Bin and velocity of a target are measured and determined in measurement coordinates. At block 604, an object state is propagated in object coordinates. In other words, using the object coordinates defining an existing state of a target object, e.g., the object's velocity and acceleration, a predicted state of the object is computed in object coordinates. At block 606, the object coordinates of the predicted state are converted into corresponding measurement coordinates, e.g. Bin and velocity. At block 608, these measurement coordinates of the objects predicted state are compared with the measurement coordinates that were measured at block 602 to calculate deltas between the propagated state and the measurement in measurement coordinates. At block 610, the deltas are converted to object coordinates. According to aspects of the present disclosure, the conversion from object coordinates to measurement coordinates at block 606, and vice versa at block 610 may be performed using an observation matrix [H], as shown in equations 8, 18 and 19, for example.

At block 610, tracks crossing in frequency are detected by using deltas in Bin (measurement coordinates) for different tracks. At block 612, counter measures for crossing tracks are performed.

Although aspects of the present disclosure are described with respect to radar systems and radar tracking methods, persons having ordinary skill in the art should understand that the disclosed techniques may also be employed in non-radar environments such as lidar, and other wave based sensing systems.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A system for tracking an object, comprising:
a signal transmitter for transmitting a transmitted signal into a region;
a receiver for receiving reflected signals generated by reflection of the transmitted signals from an object in the region;
a processor coupled to the receiver, the processor configured to
determine first measurement domain parameters of the reflected signal in a measurement domain;
compute a propagated object state of the object based on an object state parameters in an object state domain;
convert the object state parameters of the propagated object state of the object from the object state domain to a second measurement domain parameters in the measurement domain;
compute a difference between the first measurement domain parameters and second measurement domain parameters to determine a measurement domain delta of the object state;
convert the measurement domain delta of the object state to an object state delta of the object in the object state domain; and
update an object track based on the object state delta;
wherein the measurement domain includes parameters of a superposition of a chirp and a Doppler frequency of the reflected signal, and the Doppler frequency.

2. The system of claim 1, wherein the conversions between the object state domain and the measurement domain additionally uses the transmitted signal properties of chirp bandwidth, transmit time, the speed of light through the propagation medium, and carrier frequency.

3. The system of claim 1, wherein the conversions between the object state domain and the measurement domain uses at least position and velocity terms.

4. The system of claim 1, wherein the processor is configured to model noise using a noise model, wherein the noise model is in the measurement domain of a superposition of a chirp and a Doppler frequency of the reflected signal, and the Doppler frequency.

5. The system of claim 1, wherein the processor is configured to perform a data association in the measurement domain.

6. The system of claim 5, wherein the data association is performed simultaneously in both the measurement domain and object domain.

7. The system of claim 1, wherein the processor is further configured to perform a data association between a plurality of measurement domain parameters, wherein the data association is performed in the object domain.

8. The system of claim 1, wherein the processor is configured to checks a plurality of updated tracks and a plurality of measurement domain parameters, wherein a plurality of propagated object states of the object in the object coordinates are checked to see if there is a collision between the predicted superposition of a chirp and a Doppler frequency of the reflected signal, and in the case of a collision, updating of colliding tracks using the measurement state delta is cancelled.

9. The system of claim 1, wherein the processor is configured to check a plurality of updated tracks and a plurality of measurement domain parameters, wherein a plurality of propagated object state of the object in the object coordinates are checked to see if there is a collision between the predicted superposition of a chirp and a Doppler frequency of the reflected signal, and the predicted Doppler frequency, and in the case of a collision, updating of colliding tracks using the measurement state delta is cancelled.

10. A method for tracking an object detected by a radar system, the method comprising:
    determining first measurement domain parameters of a reflected radar signal in a measurement domain;
    computing a propagated object state of the object based on an object state parameters in an object state domain;
    converting the object state parameters of the propagated object state of the object from the object state domain to a second measurement domain parameters in the measurement domain;
    computing a difference between the first measurement domain parameters and second measurement domain parameters to determine a measurement domain delta of the object state;
    converting the measurement domain delta of the object state to an object state delta of the object in the object state domain; and
    updating an object track based on the object state delta;
        wherein the measurement domain includes parameters of a superposition of a chirp and a Doppler frequency of the reflected signal, and the Doppler frequency.

11. The method of claim 10, wherein the conversions between the object state domain and the measurement domain additionally uses the transmitted signal properties of chirp bandwidth, transmit time, the speed of light through the propagation medium, and carrier frequency.

12. The method of claim 10, wherein the conversions between the object state domain and the measurement domain uses at least position and velocity terms.

13. The method of claim 10, further comprising modeling noise using a noise model, wherein the noise model is in the measurement domain of a superposition of a chirp and a Doppler frequency of the reflected signal, and the Doppler frequency.

14. The method of claim 10, further comprising performing a data association in the measurement domain.

15. The method of claim 14, wherein the data association is performed simultaneously in both the measurement domain and object domain.

16. The method of claim 14, further comprising performing a data association between a plurality of measurement domain parameters, wherein the data association is done in the object domain.

17. The method of claim 10, further comprising checking a plurality of updated tracks and a plurality of measurement domain parameters, wherein a plurality of propagated object states of the object in the object coordinates are checked to see if there is a collision between the predicted superposition of a chirp and a Doppler frequency of the reflected signal, and in the case of a collision, updating of colliding tracks using the measurement state delta is cancelled.

18. The method of claim 10, further comprising checking a plurality of updated tracks and a plurality of measurement domain parameters, wherein a plurality of propagated object states of the object in the object coordinates are checked to see if there is a collision between the predicted superposition of a chirp and a Doppler frequency of the reflected signal, and the predicted Doppler frequency, and in the case of a collision, updating of colliding tracks using the measurement state delta is cancelled.

* * * * *